United States Patent [19]

Momiyama et al.

[11] Patent Number: 5,291,962
[45] Date of Patent: Mar. 8, 1994

[54] POWER STEERING DEVICE FOR USE IN MOTOR VEHICLES

[75] Inventors: Fujio Momiyama; Noriaki Tokuda, both of Hino, Japan

[73] Assignee: Hino Jidosha Kogyo Kabushiki Kaisha, Japan

[21] Appl. No.: 655,360
[22] PCT Filed: Nov. 7, 1989
[86] PCT No.: PCT/JP89/01143
  § 371 Date: Mar. 19, 1991
  § 102(e) Date: Mar. 19, 1991
[87] PCT Pub. No.: WO91/06462
  PCT Pub. Date: May 16, 1991
[51] Int. Cl.$^5$ .................................. B62D 5/06
[52] U.S. Cl. ............................. 180/132; 180/141
[58] Field of Search ............. 180/132, 133, 141, 142

[56] References Cited

U.S. PATENT DOCUMENTS

| 4,332,303 | 6/1982 | de Maight | 180/132 |
| 4,703,819 | 11/1987 | Hosotani | 180/132 |

FOREIGN PATENT DOCUMENTS

| 3515124 | 10/1986 | Fed. Rep. of Germany | 180/132 |
| 3625003 | 2/1987 | Fed. Rep. of Germany | 180/132 |
| 118574 | 7/1984 | Japan | 180/132 |
| 92969 | 5/1985 | Japan | 180/132 |
| 106181 | 5/1988 | Japan | 180/132 |

*Primary Examiner*—David M. Mitchell
*Assistant Examiner*—Kevin Hurley
*Attorney, Agent, or Firm*—Staas & Halsey

[57] ABSTRACT

A power steering device for steering the wheels of a motor vehicle has a booster mechanism, a directional control valve mechanism, a hydraulic pump mechanism, an oil pressure setting valve and a pressurized oil injection valve mechanism. The booster mechanism receives pressurized oil from different directions and generates a steering force to steer the wheels of the vehicle in a left or right direction depending on from which direction the pressurized oil is received. The hydraulic pump mechanism pressurizes hydraulic oil from an oil reserve and supplies the pressurized oil to a feeding side hydraulic pump arrangement. The directional control valve mechanism is connected to the feeding side hydraulic pump arrangement and the booster mechanism and controls which direction the pressurized oil flows from the booster. The directional control valve mechanism has first and second reaction chambers. The oil pressure setting valve is positioned in the feeding side hydraulic pump arrangement between the hydraulic pump mechanism and the directional control valve mechanism. The pressurized oil valve mechanism injects a pulse of pressurized hydraulic oil from the feeding side hydraulic pump arrangement at an upstream side of the oil pressure setting valve to one of the first and second reaction chambers, depending on the direction of a steering motion. The pulse of pressurized hydraulic oil is injected at the beginning of the steering motion and possibly during a return steering motion to straighten the path of the vehicle.

6 Claims, 13 Drawing Sheets (DIFFERENCE IN RESPONSE TIME TO LIGHT STIMULUS, BY GENDER AND AGE [1])

$T\beta$ FACTOR → $T\beta = T\varphi \times \beta STAT$ $T\beta$ FACTOR AND SUBJECTIVE JUDGEMENT IN PASSENGER CAR [4])

(OPTIMUM RANGE OF YAW ACCELERATION GAIN AND TIME CONSTANT IN PASSENGER CAR [8])

(DIFFERENCE IN YAW RATE RESPONSE BETWEEN TRUCK AND BUS)

(VARIATION OF YAW RATE RESPONSE WITH VEHICLE SPEED (BUS))

(DIFFERENCE IN TIME CONSTANT FOR DIFFERENT STEERING CHARACTERISTICS [12])

(DIFFERENCE IN TIME LAG OF YAW RATE RESPONSE IN TRUCK, BUS AND PASSENGER CAR)

(SHARE ACCOUNTED FOR BY STEERING SYSTEM OF OVERALL TIME LAG (PEAK TO PEAK))

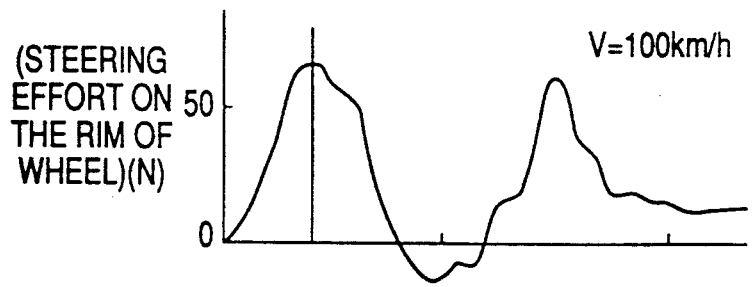
FIG. 8a (STEERING EFFORT ON THE RIM OF WHEEL)(N)
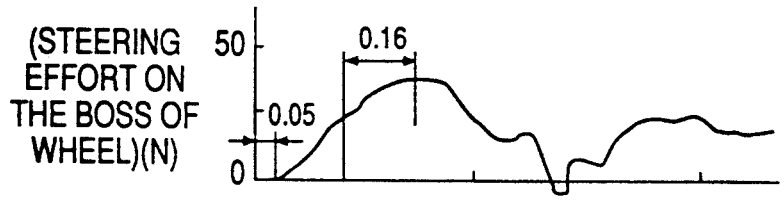
FIG. 8b (STEERING EFFORT ON THE BOSS OF WHEEL)(N)
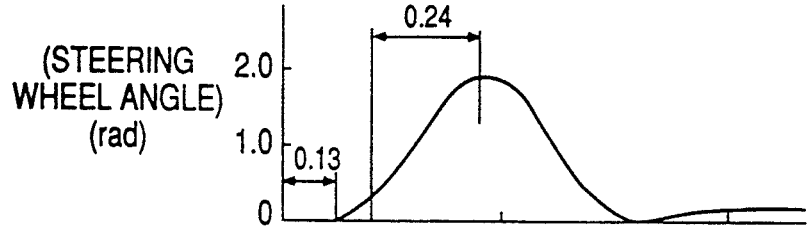
FIG. 8c (STEERING WHEEL ANGLE) (rad)
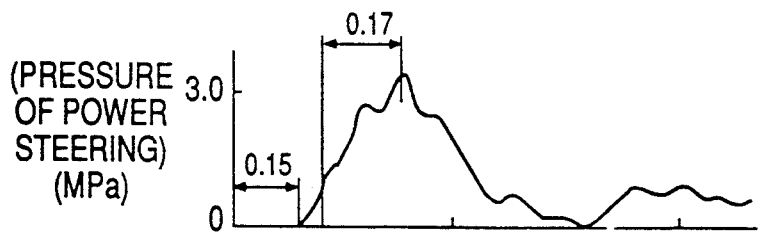
FIG. 8d (PRESSURE OF POWER STEERING) (MPa)
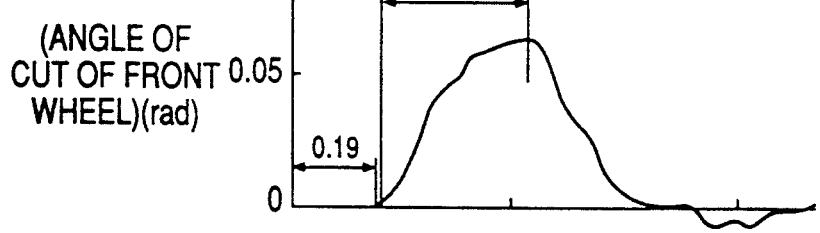
FIG. 8e (ANGLE OF CUT OF FRONT WHEEL)(rad)
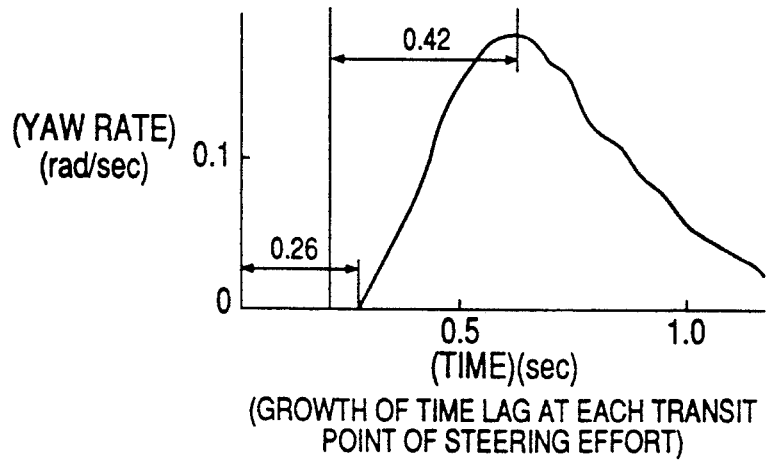
FIG. 8f (YAW RATE) (rad/sec)
(TIME)(sec)
(GROWTH OF TIME LAG AT EACH TRANSIT POINT OF STEERING EFFORT)

$$V = V_0 + \frac{dv}{dt} \cdot t$$
$$\theta = \phi + \beta$$

(VEHICLE SIMULATION MODEL)

(STEERING EFFORT ON THE RIM OF WHEEL)(N)

(STEERING WHEEL ANGLE) (rad)

(PRESSURE OF POWER STEERING) (MPa)

(ANGLE OF CUT OF FRONT WHEEL)(rad)

(YAW RATE) (rad/sec)

(TIME)(sec) (EXPERIMENTAL)    (TIME)(sec) (SIMULATION)

(VERIFICATION OF SIMULATION RESULTS)

(STUDY OF PRESSURE INJECTION TIMING BY SIMULATION)

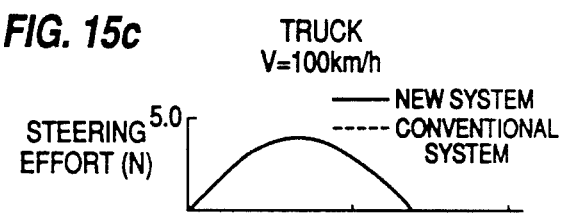
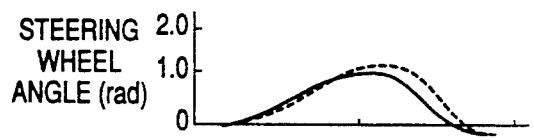
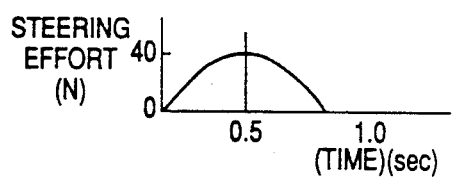
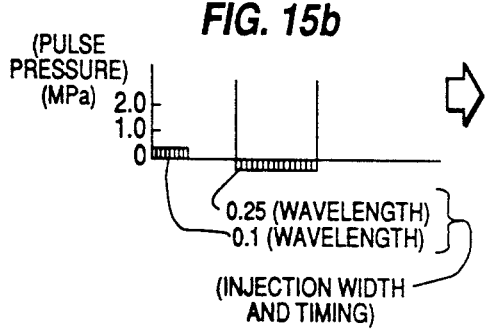
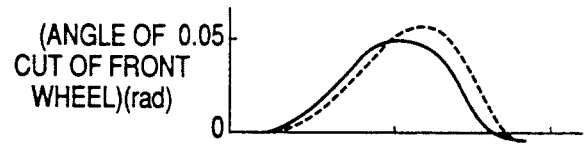
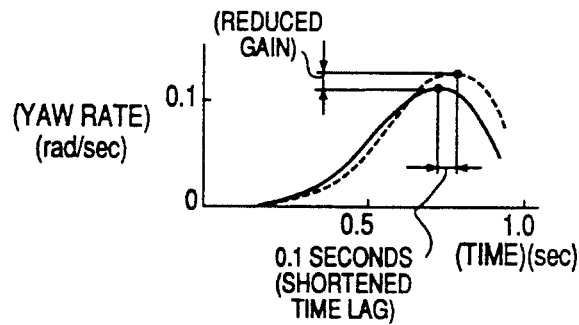

POWER STEERING DEVICE FOR USE IN MOTOR VEHICLES

BACKGROUND OF THE INVENTION

1. Field of the Invention

The present invention relates to a power steering device for use in motor vehicles in general and more particularly to a power steering device which undergoes a speed sensory control and a responsiveness control.

2. Description of the Related Art

A popular power steering device for use in motor vehicles is a speed sensing type. However, a motor vehicle provided with a power steering device which undergoes a responsiveness control is now demanded in view of the desired drivability and stability.

Further, in order to enhance drivability and stability of motor vehicles, it is necessary to investigate performance from two aspects because motor vehicle performance changes in response to steering operations of drivers, and in response to disturbances such as road irregularity and gusts of wind.

For the former aspect, one must consider increased motor vehicle speeding and the advanced ages of motor vehicle drivers which causes an expansion of in the range of physiological ability levels in relation to driving skill. It is therefore necessary to alleviate problems caused by the increased speeding and the expansion in the range of physiological ability levels within the motor vehicle side, i.e., the former aspect.

For example, an expressway in the middle of the night is as if it were a huge conveyer belt filled with trucks. These trucks are driving towards the metropolitan area. The distance between these truck groups is generally short and the speed thereof is high. Further, highway buses between cities aer present. Because of their advantages such as inexpensive fairs and ease of use, living space outside the city with a high quality, and attentive services, not only are day time highway bus services increasing, but also night time bus services are increasing. Night bus services were understood at the beginning to be used only to supplement railway train services. This is no longer true. As such, on one hand, high speed and long distance services are active. However on the other hand, in particular, with regard to trucks, the shortage of truck drivers is serious, and in addition, the age of the drivers has been increasing. Further, there appears to be an indication of woman driver expansion. The higher the speed of the motor vehicle is, the more the response performance thereof reduces. Still further, physiological abilities relating to driving skill of advanced age drivers and woman drivers are relatively low in comparison with those of young man (see FIG. 1). A system is desired which realizes a compensation in the motor vehicle for the decrease of response performance at high speeds and the physiological ability difference of the drivers. Moreover, a large sized motor vehicle, which requires a relatively wide space on the running road in comparison with a passenger car, should be provided with a better response performance than the passenger car.

Further, with regard to the desirable motor vehicle response characteristics, there are reports, one of which defines Tβ, a factor corresponding to the product of a time constant and yaw gain. The report indicates that the smaller the products is, the higher the subjective judgement of the driver is (see FIGS. 2a through 2c).

Another report indicates that there is an optimum region of moving direction holding property in a range of small time constants and of certain amounts of yaw acceleration again (see FIG. 3). These data are concerned with passenger cars. However, these tendencies are similar in trucks and buses. FIG. 4 shows an example of the response characteristic of a truck and a bus, wherein the truck is equipped with a front engine and a leaf suspension and the bus with a rear engine and an air suspension. The gain and the phase lag of the truck are smaller than those of the bus. Further, the subjective judgement of the truck driver is better than the bus driver. The gain and phase lag increase in response to an increase in the vehicle speed (see FIG. 5) and thereby burdens to drivers increase correspondingly. In view of FIG. 4 and FIG. 5, a desirable steering response is aimed at reducing both the gain and the phase lag to less than they are now. This tendency meets with the previous tendency with regard to the passenger car data, when the phase lag is assumed to belong to the time constant. When the phase lag is large, the approach to a course aimed at by a driver lags so that excess turning or swing is caused in an effort to compensate. When the gain is much larger, the excess turning is amplified so drivers can be compensated for by reducing the time constant in that the motor vehicle becomes unsteady. Still further, the problems arising from the physiological ability differences of the steering system.

Although the above description deals with the response performance with regard to the driver's steering force, the same is true with regard to road disturbances. For example, because of a disturbance 1 due to a road irregularity, an axle pedal displaces 2 and then the suspension 3 and vehicle body displace 4 which displacements are sensed 5 by the driver. When an adjusting operation is carried out, any lag included in the processes 1-5 of the adjusting steering operation causes the deviation from the course to become large accordingly. The displacement in this case (more precisely the displacement into the direction which causes the deviation from the course) corresponds to the gain and is self-evidently preferable to be minimized. Namely, such disturbance should be prevented before they take effect at the entrance.

Further, when the steering response performances of trucks and buses are compared with those of passenger cars, there is a large difference in the phase lag, which is very large in trucks and buses (see FIG. 7). For analyzing what causes make the phase lag to be so large, the time lag from the initiation of the steering operation to the initiation of a change in the moving direction was measured along its transfer route (see FIGS. 8a through 8f). The time lag in the steering system occupies 60% of the total lag (see FIG. 9). The remaining 40% is the time lag in the vehicle body system, and the time lag due to the fact that buses are larger than trucks, the ultimate reasons for the lag are the influences of their suspension structure and differences between load allotments to front and rear shafts. Trucks and buses employ a common steering device so that with regard to the time lag in the steering device, there is no difference.

Further, several studies were carried out to shorten the time lag in the steering system which occupies 60% of the total lag. Some of these went further to suggest specific system structures but failed to reach practical uses.

Two reasons are presumed for the failures. One is that although the phase lag has been shortened, concurrently the gain gets large thereby the steering wheel becomes too sensitive and the steering feeling is deteriorated. The other reason may be that since the mechanical coupling between the steering wheel and the front wheels has been disconnected, problems with safety are prevalent.

SUMMARY OF THE INVENTION

Accordingly, an object of the present invention is to provide a power steering device for use in motor vehicles which enables compensation in the motor vehicle for the reduction of the motor vehicle response performance due to high speed travel and physiological ability differences of drivers. A still further object is to enable a responsiveness control which enhances performance in response to steering force inputs. A further object is to provide a device which enables a speed sensing control which changes the required steering effort in response to the speed of the motor vehicle.

The present invention is a power steering device for use in motor vehicles in which a pressure oil setting valve is disposed in a hydraulic pipe arrangement of a feed side at an upstream side of a direction control valve. During turning of a steering wheel, a pressure oil for compensation (correction) is injected with a pressure oil injection valve from the upstream side of the pressure oil setting valve (and the directional control valve) in the hydraulic pipe arrangement of the feed side. The pressure oil for compensation is injected into one of a pair of reaction chambers (the chamber in the turning direction) of the directional control valve at the beginning of the steering wheel turning. Thereby a power steering device for use in motor vehicles is achieved which enhances the response performance to steering force inputs by reducing the phase lag without increasing the gain. The device enables compensation in the motor vehicle for the reduction of the motor vehicle response performance at a high speeds and the reduction due to physiological ability differences of drivers.

Further, in another aspect of the present invention is a power steering device for use in motor vehicles in which a pressure oil setting valve is disposed in a hydraulic pipe arrangement of a feed side at an upstream side of a directional control valve. During turning of a steering wheel, a pressure oil for compensation is injected with a pressure oil injection valve from the upstream side of the pressure oil setting valve in the hydraulic pipe arrangement of the feed side. The oil is injected into one of a pair of reaction chambers (the chamber in the turning direction) of the directional control valve at the beginning of the steering wheel turning. According to this aspect, during returning of the steering wheel i.e., to drive straight, the pressure oil for compensation is also injected. Like before, the pressure oil injection valve injects the oil from the upstream side of the pressure oil setting valve in the hydraulic pipe arrangement of the feed side into the pair of reaction chambers in the returning direction of the directional control valve. Thereby a power steering device for use in motor vehicles is achieved which further enhances a response performance to steering force inputs by reducing the phase lag without increasing the gain.

Still further, in yet another aspect of the present invention is a power steering device for use in motor vehicles in which a reaction regulating valve is disposed in a reaction passage communicating a pair of reaction chambers of the directional control valve. The reaction regulating valve is throttled, i.e., partially closed, in response to the motor vehicle speed. Thereby a power steering device for use in motor vehicles is achieved in which the required steering effort applied to the steering wheel is rendered lighter during stationary turning and low speed cruising, and during high speed cruising, the required steering effort applied to the steering wheel is rendered heavier to thereby obtain a sufficient response from the steering wheel.

BRIEF DESCRIPTION OF THE DRAWINGS

FIGS. 8a through 8f are graphs illustrating a growth of time lag at each transit point of steering effort, FIGS. 15a through 15g are graphs illustrating final simulation results with regard to the injection timing and injection width of the pressure oil.

DETAILED DESCRIPTION OF THE PREFERRED EMBODIMENT

Hereinbelow, a specific embodiment of a power steering device for use in motor vehicles according to the present invention will be explained with reference to the drawings.

Figure 11:
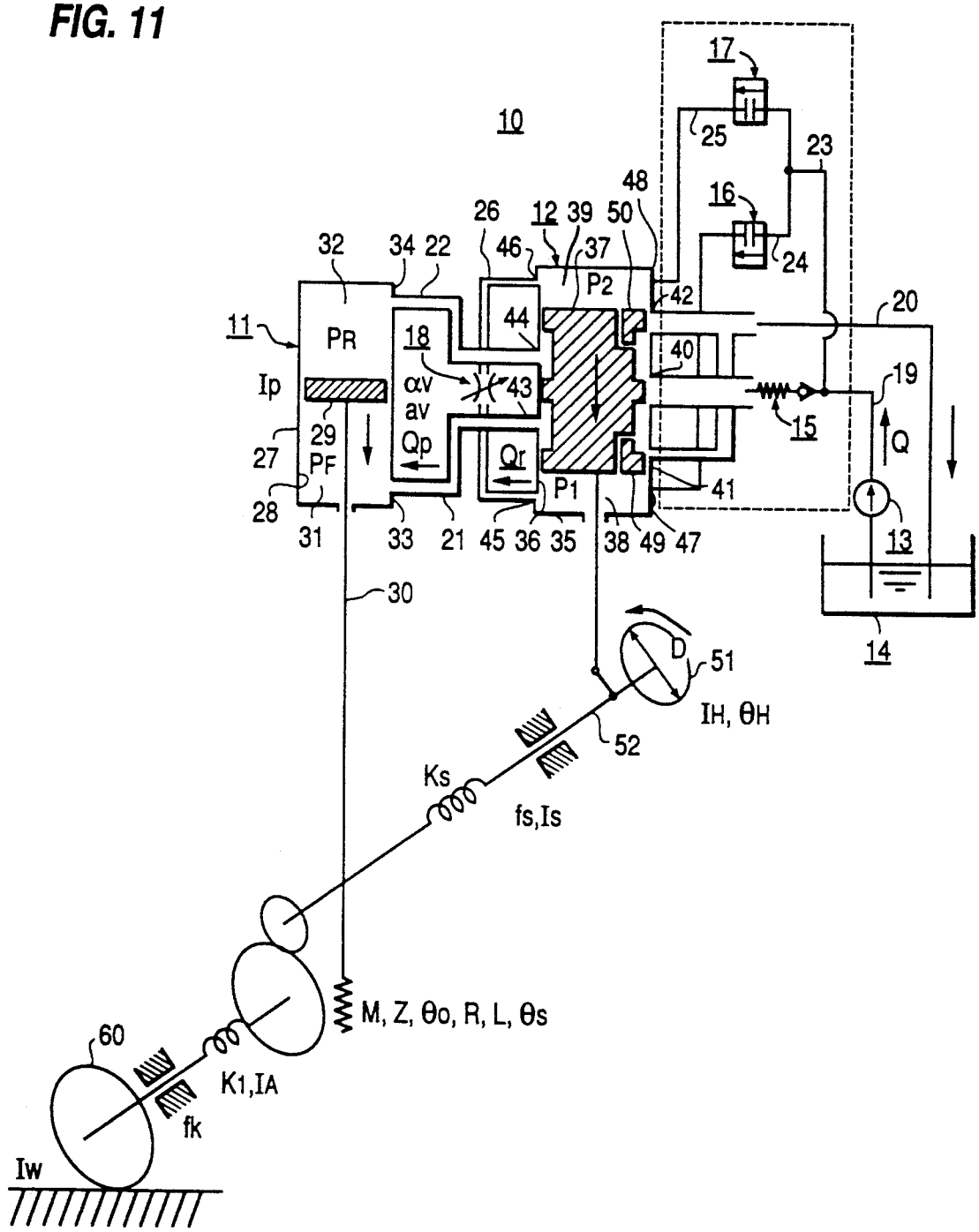
FIG. 11 is a schematic view illustrating a power steering device for use in motor vehicles according to the present invention.
Figure 12A:
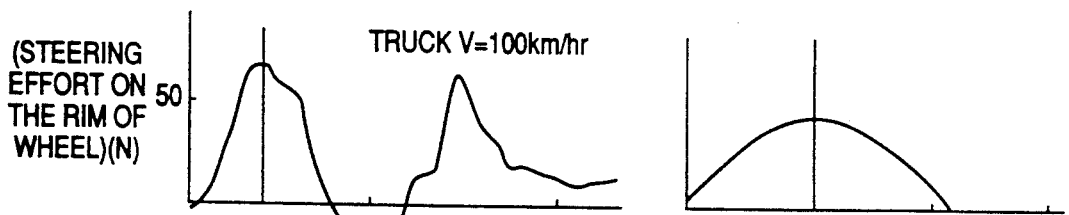
FIGS. 12a through 12e are graphs illustrating a verification of simulation results with data of an actual motor vehicle (truck)
Figure 12B:
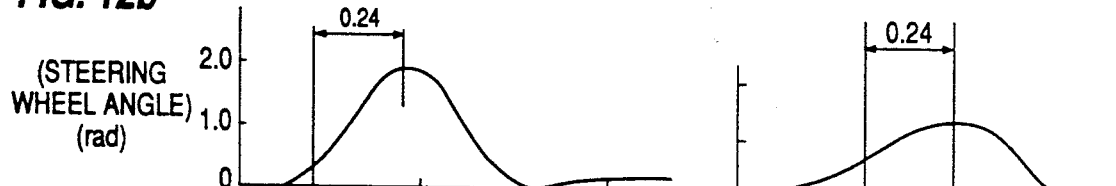
Figure 12C:
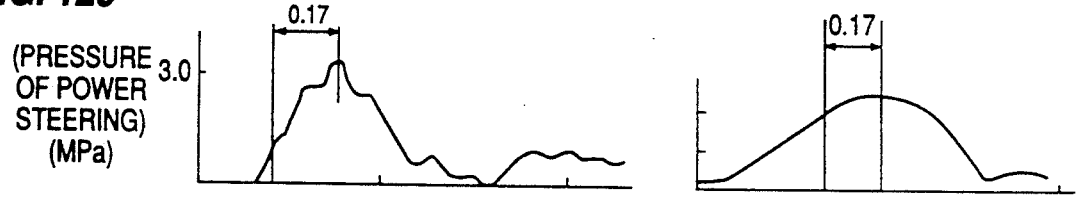
Figure 12D:
Figure 12E:
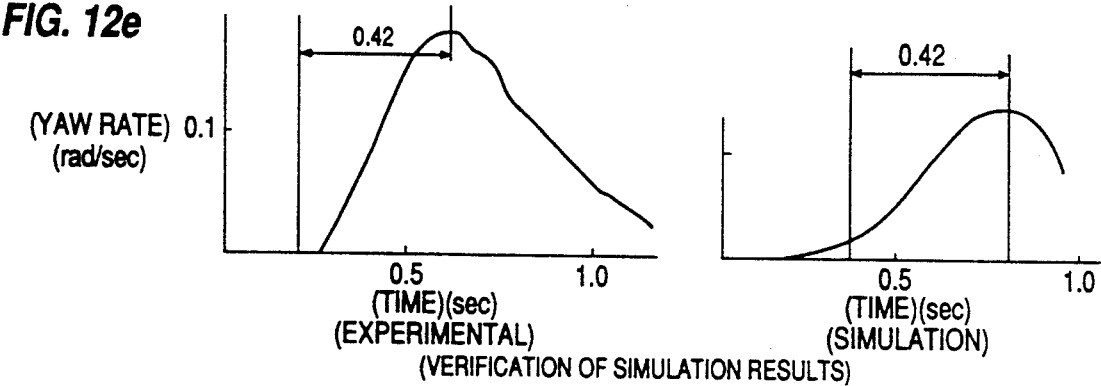

FIG. 11 shows a power steering device for use in a motor vehicle according to the present invention as it is assembled into a truck.

This power steering device 10 includes, a booster 11 which is mechanically coupled with the front wheels of the truck. The booster 11 generates a steering effort which is provided to the front wheels. A directional control valve 12 is provided with a pair of reaction chambers and is operated by a steering wheel 51. The directional control valve 12 controls the direction which an operating pressure oil flows respectively from a hydraulic pump 13 at a feeding side to the booster 11. The operating pressure oil simultaneously flows from the booster 11 through a hydraulic pipe arrangement 20 at a returning side to an oil reservoir 14. A pressure setting valve 15 is disposed in the hydraulic pipe arrangement 19 at the feeding side, upstream from the directional control valve 12. Pressure oil injection valves 16, 17 are disposed in compensation pressure oil channels 23, 24, 25 which are connected to a pair of the reaction chambers of the directional control valve 12 through the hydraulic pipe arrangement 19 of the feeding side. The injection valves 16, 17 are upstream from the directional control valve 12. A reaction regulating valve 18 is disposed in a reaction passage 26 which communicates the pair of the reaction chambers 38, 39 of the directional control valve 12. A controller (not shown), and is assembled in the device, and the input side of the controller is electrically connected to a vehicle speed sensor (not shown) and a steering sensor (not shown). The output side of the controller is electrically connected to solenoid coils (not shown) of the pressure oil injection valves 16, 17 and an electric actuator (not shown) of the reaction regulating valve 18 respectively so as to achieve a responsiveness control which reduces a delay in response to a steering operation and in response to a speed sensing control, through which a hydraulic reaction corresponding to vehicle speed is obtained.

By means of the responsive control to reduce turning delay, the controller controls current flowing through the solenoid coils of the pressure oil injection valves 16, 17 in response to signals from the steering sensor and selectively opens and closes the pressure oil injection valves 16, 17 depending on which way the steering wheel is turned. In this manner, a pressure oil for compensation is selectively injected into one of the reaction chambers 38, 39 of the directional control valve 12 from the upstream side of the pressure setting valve 15 in the hydraulic pipe arrangement 19 at the feeding side. With this arrangement, the turning delay for the steering operation, in other words, the response delay for the steering operation, is reduced to suppress increases of the yaw rate and the phase lag and to maintain the same small. Of course, in this responsiveness control, during the turning of the steering wheel 51, the pressure oil for compensation (correction) is injected at the beginning of turning of the steering wheel 51, i.e., when first turning into a turn, with the pressure oil injection valves 16, 17 from the upstream side of the pressure oil setting valve 15 in the hydraulic pipe arrangement of the feeding side. The pressure oil is injected into one of the pair of the reaction chambers 38, 39 of the directional control valve 12, the chamber which corresponds to the turning direction. During returning of the steering wheel 51 to drive straight, the pressure oil for compensation (correction) is injected by one of the pressure oil injection valves 16, 17 from the upstream side of the pressure oil setting valve 15 in the hydraulic pipe arrangement 19 of the feeding side into one of the pair of the reaction chambers of the directional control valve 12. Which injection valve and which reaction chamber operate depends on the returning direction.

On the other hand, by means of the speed sensing control, the controller controls a current flowing through the electric actuator of the reaction regulating valve 18 in response to signals from the vehicle speed sensor. This regulates the throttling of the reaction regulating valve 18, i.e., partially closes the reaction valve, in response to an increase in the motor vehicle speed to thereby change the resistance the oil encounters when flowing between the reaction chambers of the directional control valve 12. Therefore the required steering effort applied to the steering wheel is rendered lighter during stationary turning and low speed cruising, and during a high speed cruising the required steering effort applied to the steering wheel is rendered heavier to obtain a sufficient response from the steering wheel.

The booster 11 includes a cylinder body 27 in which a cylinder bore 28 is formed and a piston 29 which is reciprocatingly and slidably fitted in the cylinder bore 28. The piston 29 forms a pair of cylinder chambers 31, 32 in the cylinder bore 28. The booster 11 also includes a piston rod 30 one end of which is fixed to the piston 29 and the other end of which extends outwardly from the cylinder body 27 so as to be movable in and out therefrom. Oil ports 33, 34 are connected to the corresponding cylinder chambers 31, 32 and are formed on the cylinder body 27.

The directional control valve 12 includes a valve body 35 in which a valve bore is provided and which is assembled in the cylinder body 27 of the booster 11. A spool 37 is reciprocatingly and slidably fitted in the valve bore 36, and forms a pair of reaction chambers 38, 39 in the valve bore 36. The spool 37 is link-coupled with a steering shaft 52 and slidably reciprocates in the valve bore 36 with the motion which corresponds to steering wheel 51 motion. The directional control valve controls the direction which the operating pressure oil flows respectively from the hydraulic pump 13 through the hydraulic pipe arrangement 19 at the feeding side to the cylinder chambers 31, 32 of the booster 11. Simultaneously, the oil flows from the cylinder chambers 31, 32 of the booster 11 through the hydraulic pipe arrangement 20 at the returning side to the oil reservoir 14 wherein the steering amount of the booster 11 is constituted so as to be feedback. A pump port 40, tank ports 41, 42, cylinder ports 43, 44, reaction ports 45, 46 and injection ports 47, 48 are connected to the valve bore 36 at respective predetermined positions and are formed on the valve body 35. The pump port 40 is connected to the hydraulic pipe arrangement 19 of the feeding side, and the tank ports 41, 42 to the hydraulic pipe arrangement 20 at the returning side respectively. Further, the cylinder ports 43, 44 are connected to the corresponding oil ports 33, 34 through communicating channels 21, 22. Through reaction communicating ports 49, 50 formed in the spool 37, operating pressure oil is fed from the hydraulic pump 13 to either one of the reaction chambers 38, 39. Simultaneously the operating pressure oil is returned from the other of the reaction chambers 38, 39 to the oil reservoir 14 through one of the tank ports 41, 42. Which reaction chamber receives the oil is determined by the sliding direction of the spool 37 when the spool 37 slidably reciprocates in the valve bore 36.

The hydraulic pump 13 is actuated by a diesel engine (not shown) mounted on the truck, and is disposed in the hydraulic pipe arrangement 19 at the feeding side in order to feed the operating oil to the booster 11. It intakes the oil from the oil reservoir 14, pressurizes the oil and is adapted to discharge an amount of the pressure oil nearly proportional to the diesel engine speed, i.e., RPM.

After the power steering device 10 was assembled as explained above, a computer program capable of simulating the power steering device 10 was prepared for determining an optimum control. Then verification with data from an actual motor vehicle was carried out. Thereafter, an investigation was performed to reduce the phase lag without increasing the gain regarding when should control be employed and what kind of control should be employed.

Figure 10A:
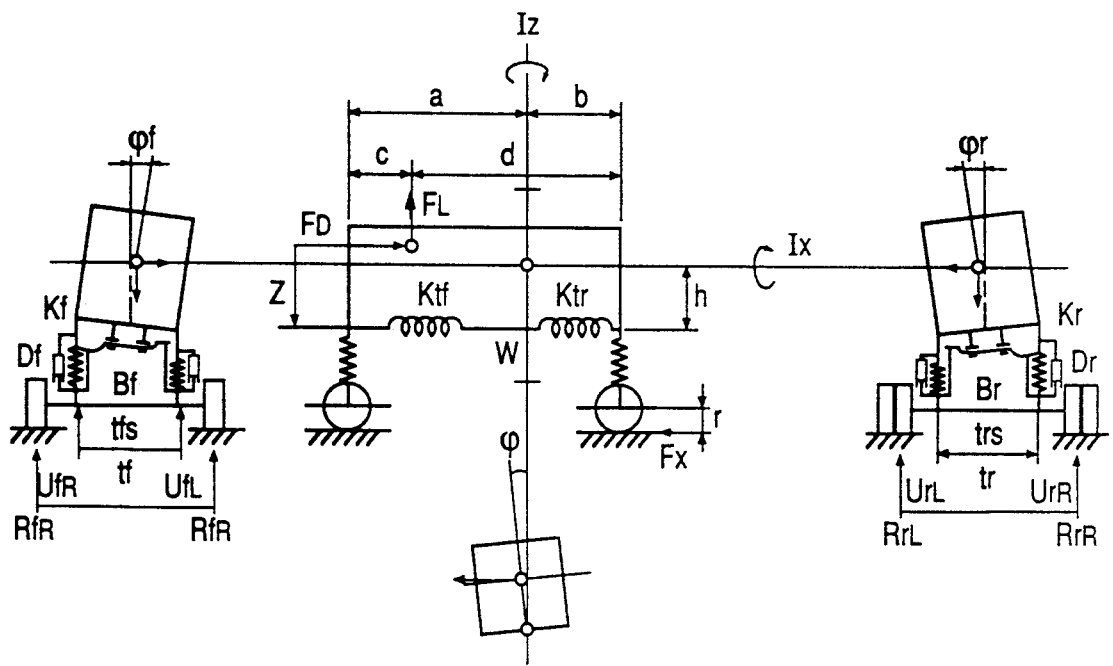
FIGS. 10a through 10c are diagrams illustrating a vehicle simulation model.
Figure 10C:
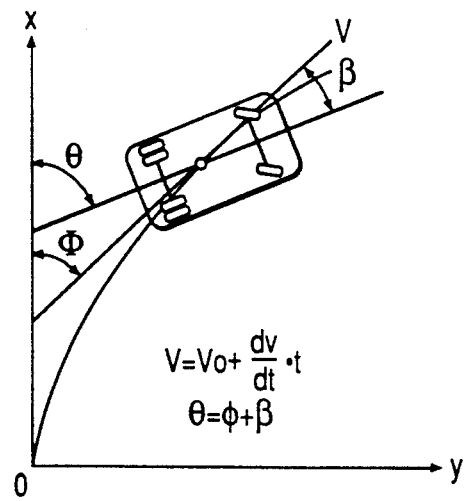
Figure 10B:
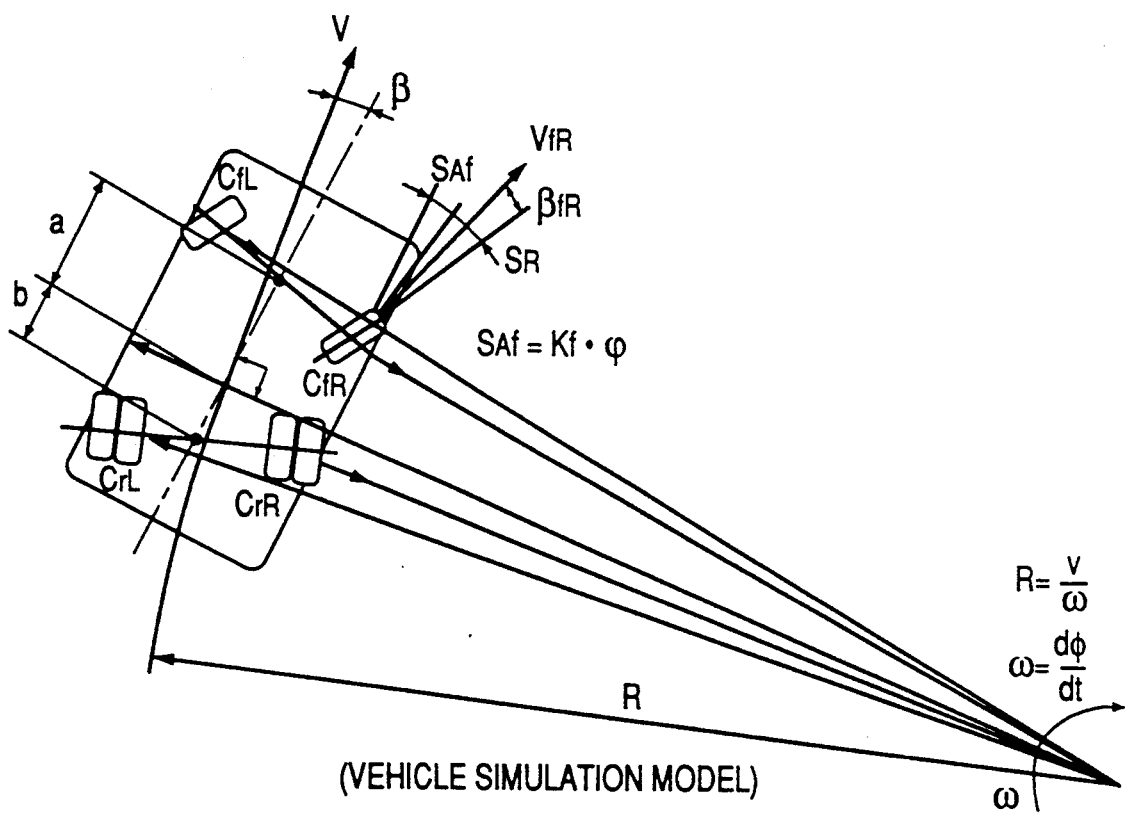

For this simulation, the vehicle model shown in FIGS. 10a through 10c were used. Further, equations of motion and hydraulic pressure calculation equations were formulated, and such were solved by using CSSL (Continuous System Simulation Language) (see FIGS. 12a through 12e). The results of the calculations showed nearly the same tendency as the actually measured data. Therefore, the study on the optimum control was carried out using the simulation results.

Figure 9:
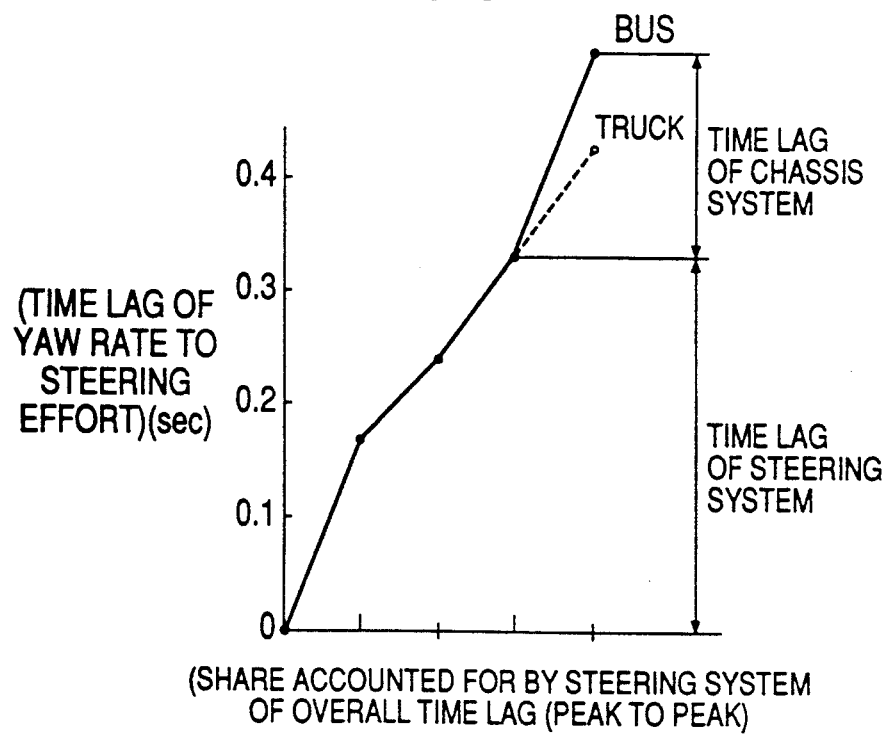
FIG. 9 is a graph illustrating the portion of the time lag accounted for by the steering system.
Figure 13:
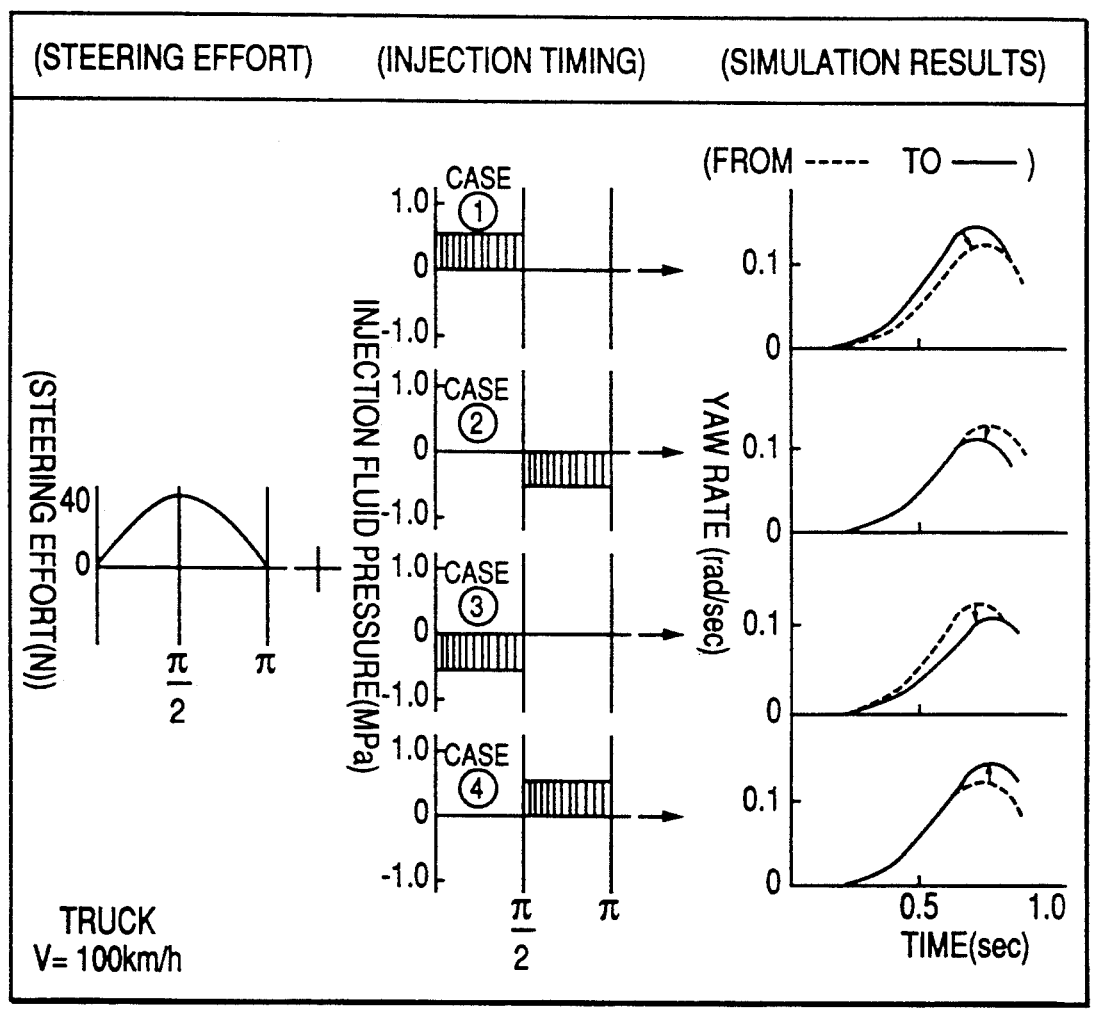
FIG. 13 is a diagrammatic table illustrating the results of a simulation study of pressure oil injection timing.
Figure 14A:
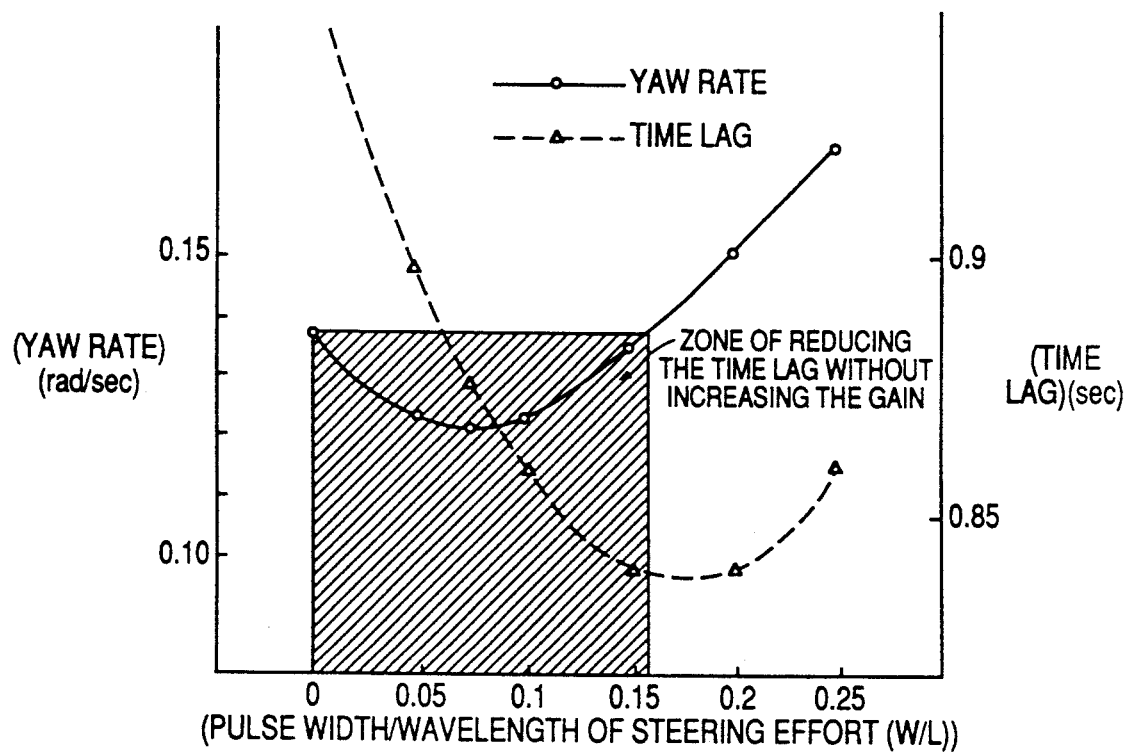
FIGS. 14a and 14b are graphs illustrating the results of a simulation study of pressure oil injection width.
Figure 14B:
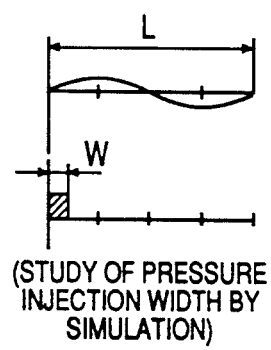

This study on the optimum control will be explained hereinbelow. As will be understood from FIG. 9, generation of hydraulic pressure by the power steering device 10 lags by 0.1–0.2 sec. from the application of a steering effort to the steering wheel 51. When the hydraulic pressure is immediately generated after catching steering signals, i.e., steering force, is, a shortening of the delay at least by 0.1 sec. is enabled. This shortening 0.1 sec. is equivalent to improving delay level of a bus to that of the truck or improving the delay level of a vehicle traveling at a vehicle speed of 100 Km/h to a vehicle traveling at a speed of 60 Km/h or less. With such in mind, calculations were carried out in which a correcting hydraulic pressure of +5 Kg/cm$^2$, namely a pulse hydraulic pressure, is applied to the reaction chambers 38, 39 of the directional control valve 12 immediately after steering signals are detected (see FIG. 13), and wherein four cases, in that, case 1 through case 4 were calculated. Further, with regard to case 1, the calculation was carried out by changing the pulse width of the hydraulic pressure. In order to reduce the time lag without increasing the gain, it was realized that when a 0.1 wavelength pulse in case 1 and 0.25 wavelength pulse in case 2 were applied, desirable results were obtained.

Further, another case was calculated wherein the 0.1 wavelength pulse in case 1 was applied during the beginning of the turning of the steering wheel 51 and the 0.25 wavelength pulse in case 2 was applied during the returning of the steering wheel 51 (see FIGS. 15a through 15g). As a result, both the gain and the phase lag were reduced.

Figure 1:
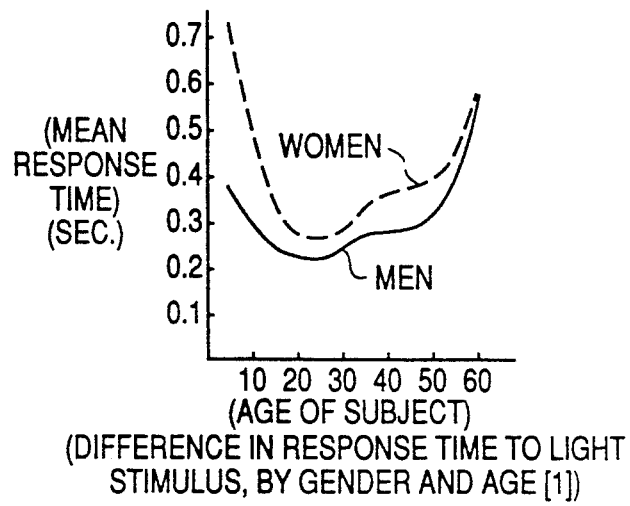
FIG. 1 is a graph illustrating the difference with regard to response time to light stimulus as it varies by gender and age.
Figure 2A:
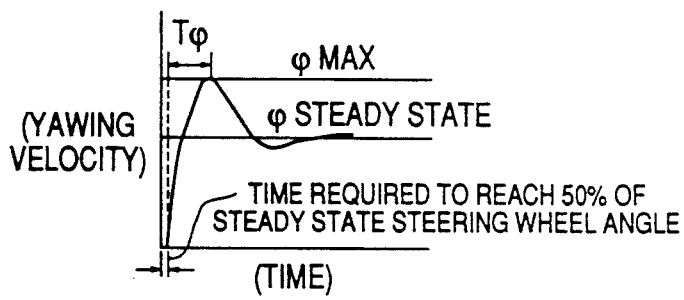
FIGS. 2a through 2c are graphs illustrating a T$\beta$ factor which corresponds to the subjective judgement in a passenger car.
Figure 2B:
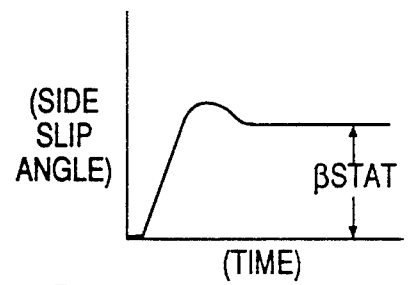
Figure 2C:
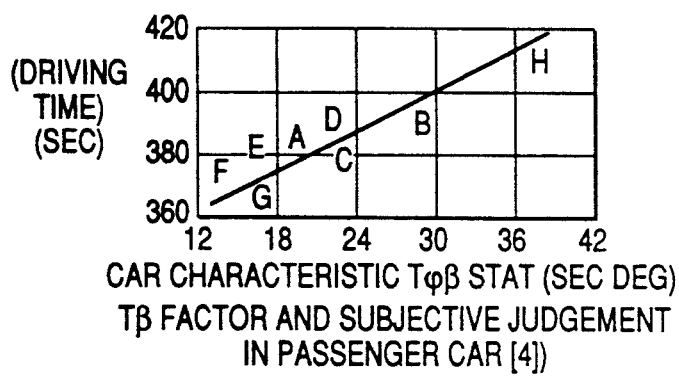
Figure 3:
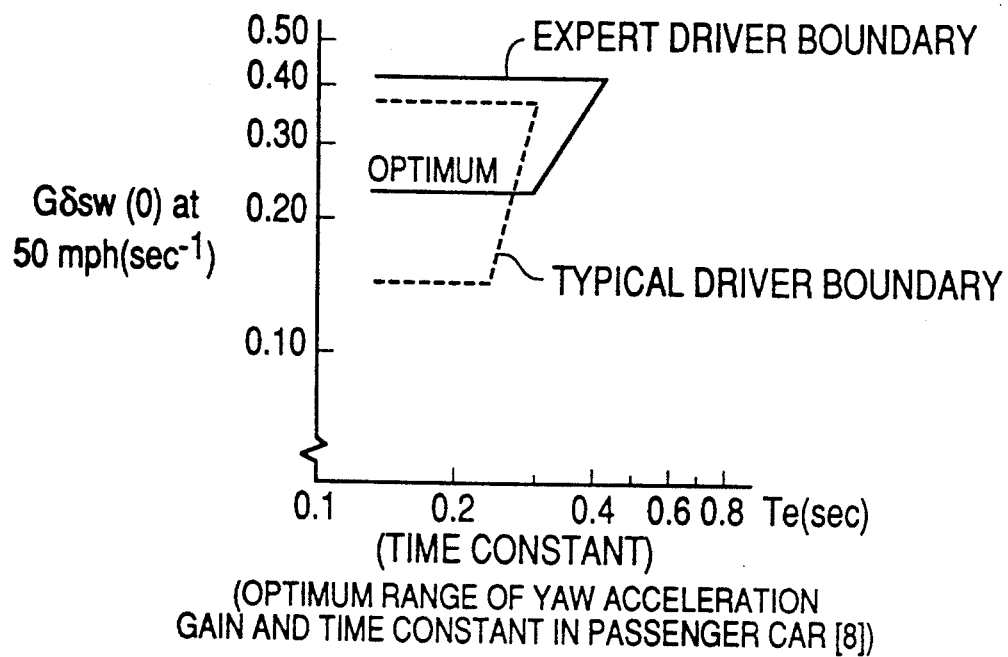
FIG. 3 is a graph illustrating optimum ranges of the yaw acceleration gain and the time constant in a passenger car.
Figure 4:
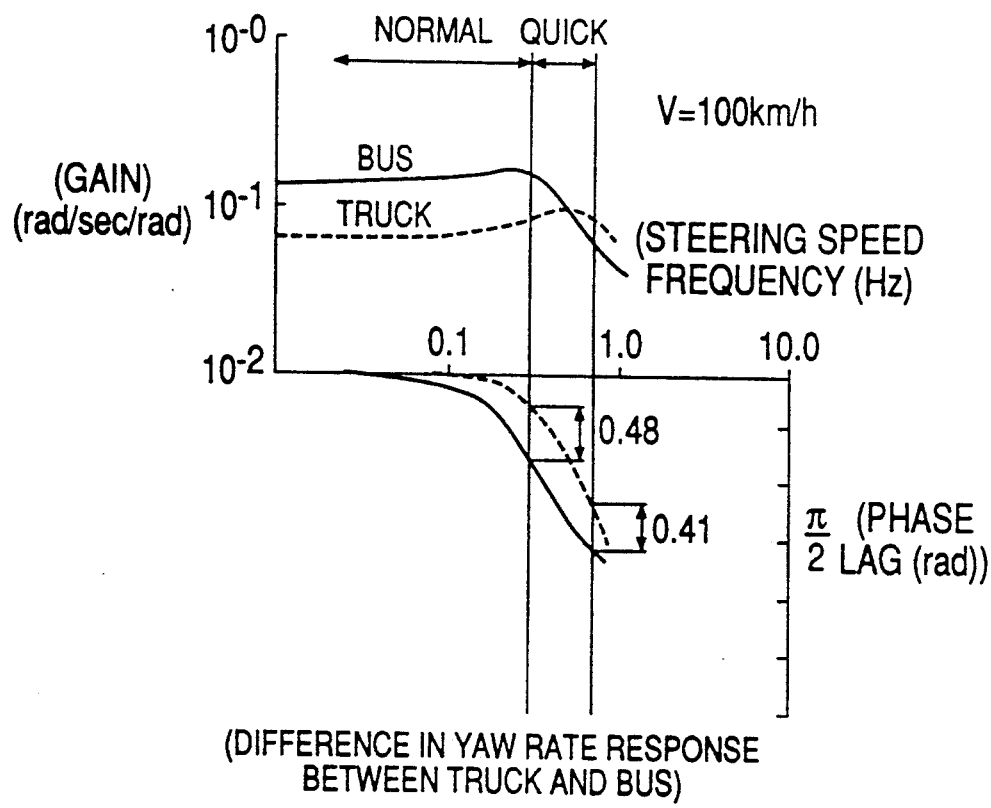
FIG. 4 is a graph illustrating the difference in yaw rate response between a truck and a bus.
Figure 5:
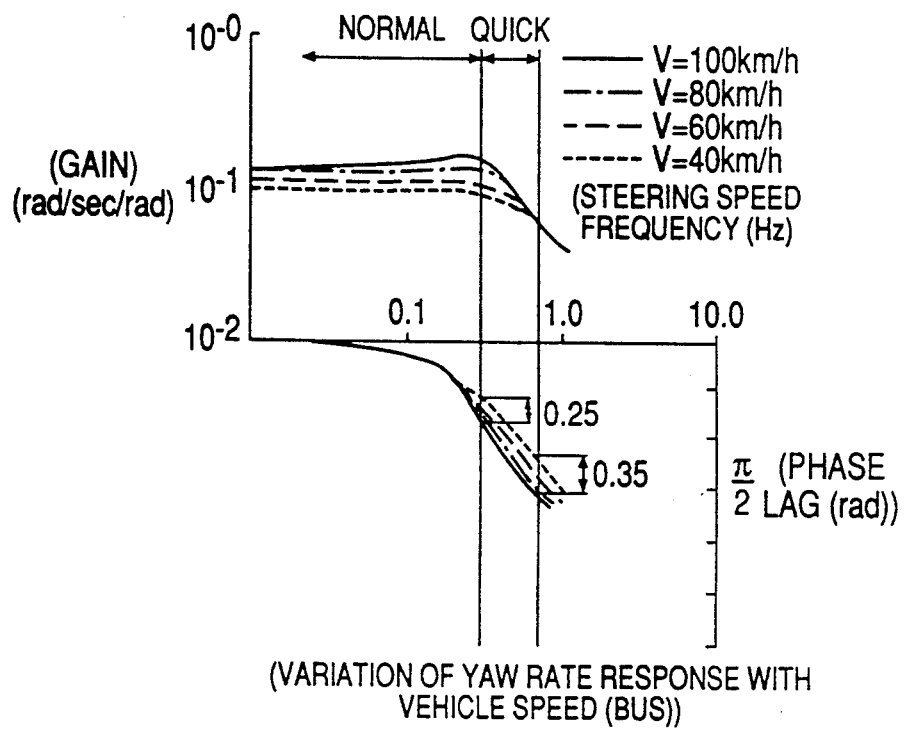
FIG. 5 is a graph illustrating a variation of yaw rate response with vehicle speeds.
Figure 6:
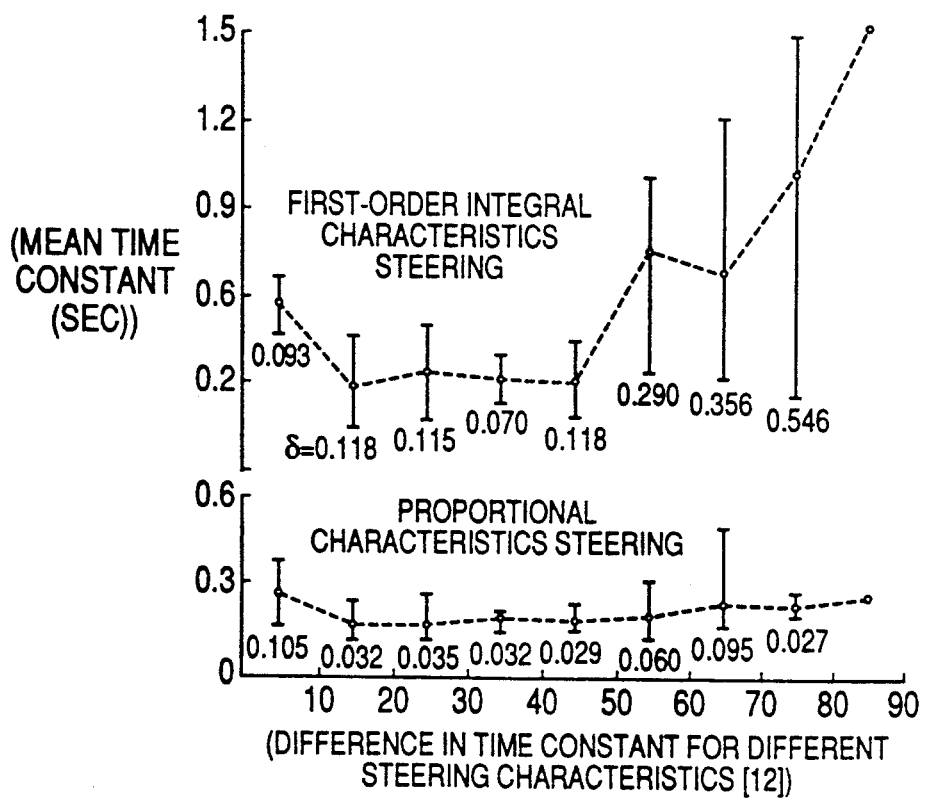
FIG. 6 is a graph illustrating a difference in time constant for different steering characteristics.
Figure 7:
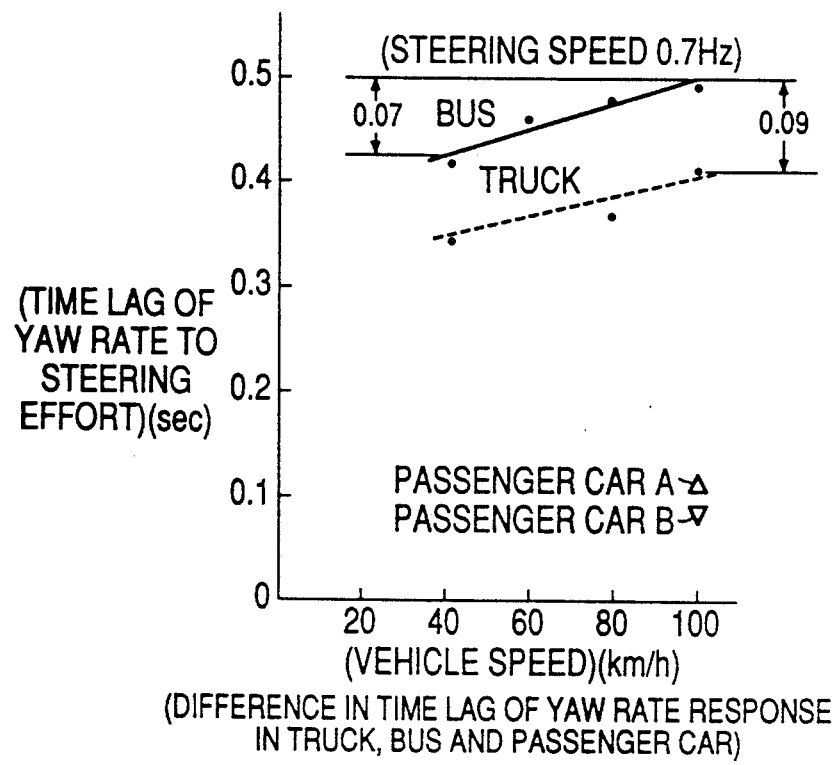
FIG. 7 is a graph illustrating a difference in time lag of yaw rate response in a truck, bus and passenger car.

When this is explained by using FIG. 7, the level of phase lag during cruising at a vehicle speed of 100 Km/h was reduced to that equivalent to cruising at a vehicle speed of 60 Km/h.

Therefore, based on the study results thus obtained, the power steering device 10 was operated, wherein the oil pressure at the upstream is always maintained higher by 5 Kg/cm$^2$ (pressure oil) greater than the oil circuit pressure with the use of the hydraulic pressure setting valve 15. This provides the +5 kg/cm$^2$ pressure of the oil injection by valves 16, 17.

When a steering effort acts on the steering wheel 51, the steering sensor which is built-in in the steering wheel 51 detects the effort. Then, pressure oil injection valves 16, 17 are selectively opened by the controller, i.e., one of the valves 16, 17, and the compensation pressure oil is selectively injected into the reaction chambers 38, 39 of the directional control valve 12, i.e., one of the chambers 38, 39. Directional control valve 12 is thus actuated by bypassing the mechanical system, i.e., movement of spool 37, and the cylinder hydraulic pressure in the booster 11 is immediately built up.

In such manner, the responsiveness control is carried in the power steering device 10. From the above aspect, the power steering device 10 of this case is a feed forward control system.

As explained above this power steering device 10 was assembled in a truck and tested. The results thereof are illustrated in FIG. 16.

Figure 16:
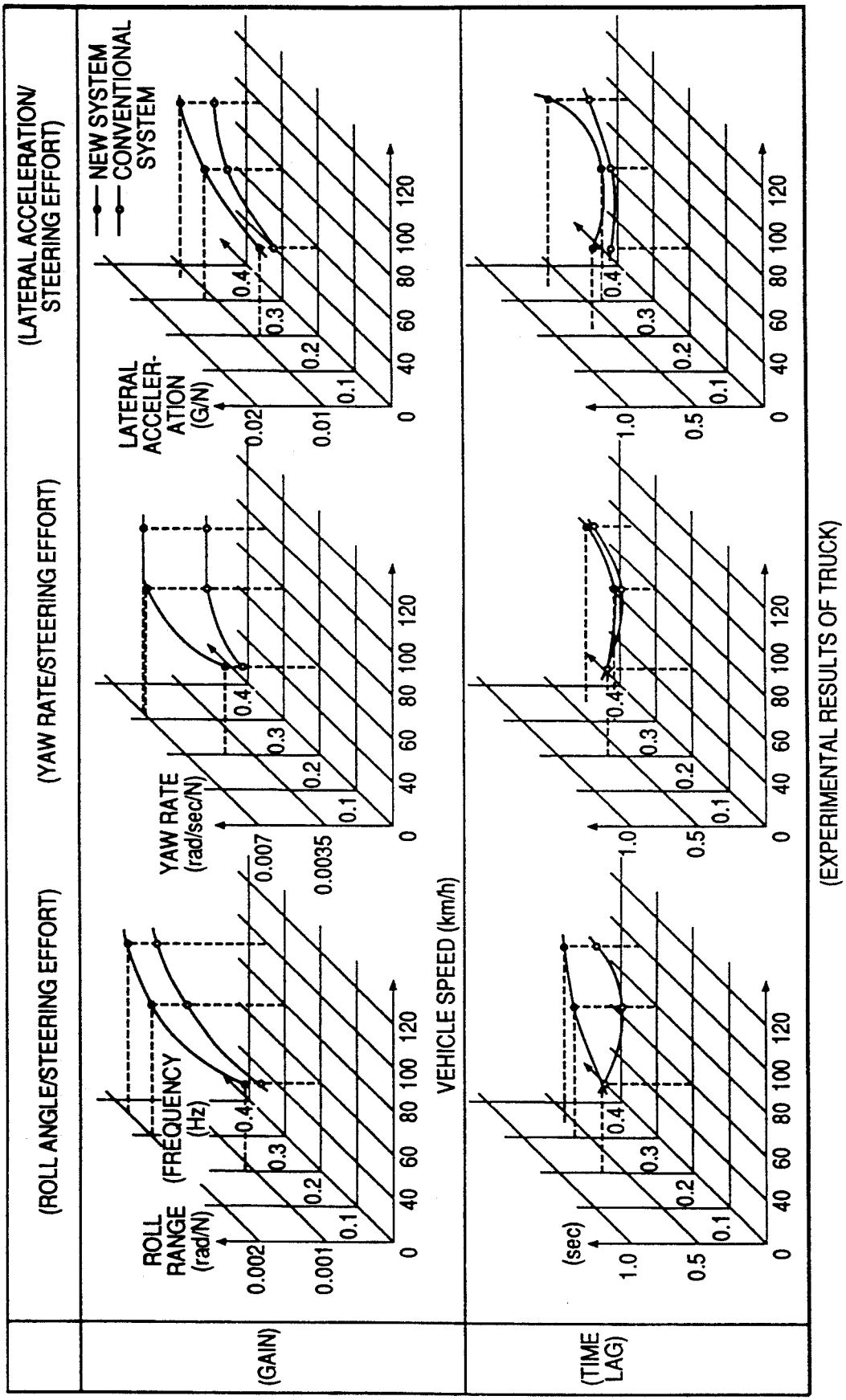
FIG. 16 is a diagrammatic table illustrating experimental results of an actual motor vehicle (truck).

As seen in FIG. 16, all of roll angle, yaw rate, lateral G gain and phase lag are remarkably reduced and the responsiveness during cruising at a vehicle speed of 100 Km/h has been improved to a responsiveness equivalent to the cruising below a vehicle speed of 60 Km/h (60 km/h with a conventional power steering device).

On the other hand, the speed sensing control of this power steering device is operated in the same manner as the conventional power steering device.

From the above examples of the present invention explained with reference to the drawings, persons having ordinary skill in the technical field pertaining the present invention can easily replace the present invention for several modifications. In doing so, the contents of the present invention are indispensable for achieving the tasks of the present invention and completing the invention. Thus, there are modification which are the nature of the present invention, are originated from the technical essence of the present invention and are within the scope of the present invention as claimed in the amended claims.

As will be understood from the above, the power steering device for use in the motor vehicle according to the present invention is suitable for use in automobiles, and in particular, is suitable for use in trucks and buses.

What is claimed is:

1. A power steering device for steering the wheels of a motor vehicle, comprising:
    booster means for receiving pressurized hydraulic oil from different directions and for generating a steering force to steer the wheels of the vehicle in a left or right direction depending on from which direction the pressurized oil is received;
    hydraulic pump means for pressurizing hydraulic oil from an oil reserve and supplying the pressurized hydraulic oil to a feeding side hydraulic pipe arrangement;
    directional control valve means connected to the feeding side hydraulic pipe arrangement and the booster means for controlling which direction the pressurized hydraulic oil flows to the booster, the directional control valve means having first and second reaction chambers;
    an oil pressure setting valve positioned in the feeding side hydraulic pipe arrangement between the hydraulic pump means and the directional control valve means; and
    pressurized oil injection valve means for injecting a pulse of pressurized hydraulic oil from the feeding side hydraulic pipe arrangement at an upstream side of the oil pressure setting valve to one of the first and second reaction chambers depending on the direction of a steering motion, the pulse of pressurized hydraulic oil being injected during an initial steering into a turn and having a pulse length per wavelength in steering effort ration of 0.075±0.075.

2. A power steering device for steering the wheels of a motor vehicle, comprising:
- booster means for receiving pressurized hydraulic oil from different directions and for generating a steering force to steer the wheels of the vehicle in a left or right direction depending on from which direction the pressurized oil is received;
- hydraulic pump means for pressurizing hydraulic oil from an oil reserve and supplying the pressurized hydraulic oil to a feeding side hydraulic pipe arrangement;
- directional control valve means connected to the feeding side hydraulic pipe arrangement and the booster means for controlling which direction the pressurized hydraulic oil flows to the booster, the directional control valve means having first and second reaction chambers;
- an oil pressure setting valve positioned in the feeding side hydraulic pipe arrangement between the hydraulic pump means and the directional control valve means; and
- pressurized oil injection valve means for injecting a pulse of pressurized hydraulic oil from the feeding side hydraulic pipe arrangement at an upstream side of the oil pressure setting valve to one of the first and second reaction chambers depending on the direction of a steering motion, the pulse of pressurized hydraulic oil being injected during an initial steering into a turn.

3. A power steering device for steering the wheels of a motor vehicle, comprising:
- booster means for receiving pressurized hydraulic oil from different directions and for generating a steering force to steer the wheels of the vehicle in a left or right direction depending on from which direction the pressurized oil is received;
- hydraulic pump means for pressurizing hydraulic oil from an oil reserve and supplying the pressurized hydraulic oil to a feeding side hydraulic pipe arrangement;
- directional control valve means connected to the feeding side hydraulic pipe arrangement and the booster means for controlling which direction the pressurized hydraulic oil flows to the booster, the directional control valve means having first and second reaction chambers;
- an oil pressure setting valve positioned in the feeding side hydraulic pipe arrangement between the hydraulic pump means and the directional control valve means; and
- pressurized oil injection valve means for injecting a pulse of pressurized hydraulic oil from the feeding side hydraulic pipe arrangement at an upstream side of the oil pressure setting valve to one of the first and second reaction chambers depending on the direction of a steering motion, the pulse of pressurized hydraulic oil being injected during an initial steering into a turn and an initial steering out of a turn.

4. A power steering device for steering the wheels of a motor vehicle, comprising:
- booster means for receiving pressurized hydraulic oil from different directions and for generating a steering force to steer the wheels of the vehicle in a left or right direction depending on from which direction the pressurized oil is received;
- hydraulic pump means for pressurizing hydraulic oil from an oil reserve and supplying the pressurized hydraulic oil to a feeding side hydraulic pipe arrangement;
- directional control valve means connected to the feeding side hydraulic pipe arrangement and the booster means for controlling which direction the pressurized hydraulic oil flows to the booster, the directional control valve means having first and second reaction chambers;
- an oil pressure setting valve positioned in the feeding side hydraulic pipe arrangement between the hydraulic pump means and the directional control valve means; and
- pressurized oil injection valve means for injecting a pulse of pressurized hydraulic oil from the feeding side hydraulic pipe arrangement at an upstream side of the oil pressure setting valve to one of the first and second reaction chambers depending on the direction of a steering motion, the pulse of pressurized hydraulic oil being injected during an initial steering into a turn and an initial steering out of a turn, the pulse of pressurized hydraulic oil has a pulse length per wavelength in steering effort ratio of 0.075±0.075 for the injection during the initial steering into a turn and a pulse length per wavelength in steering effort ration of 0.25±0.25 for the initial steering out of a turn.

5. A power steering device for steering the wheels of a motor vehicle, comprising:
- booster means for receiving pressurized hydraulic oil from different directions and for generating a steering force to steer the wheels of the vehicle in a left or right direction depending on from which direction the pressurized oil is received;
- hydraulic pump means for pressurizing hydraulic oil from an oil reserve and supplying the pressurized hydraulic oil to a feeding side hydraulic pipe arrangement;
- directional control valve means connected to the feeding side hydraulic pipe arrangement and the booster means for controlling which direction the pressurized hydraulic oil flows to the booster, the directional control valve means having first and second reaction chambers connected by a passage;
- an oil pressure setting valve positioned in the feeding side hydraulic pipe arrangement between the hydraulic pump means and the directional control valve means;
- pressurized oil injection valve means for injecting a pulse of pressurized hydraulic oil from the feeding side hydraulic pipe arrangement at an upstream side of the oil pressure setting valve to one of the first and second reaction chambers depending on the direction of a steering motion, the pulse of pressurized hydraulic oil being injected during an initial steering into a turn; and
- reaction regulating valve means for throttling in response to varying motor vehicle speeds, the reaction regulating valve means being positioned in the passage connecting the first and second reaction chambers of the directional control valve means.

6. A power steering device for steering the wheels of a motor vehicle, comprising:
- booster means for receiving pressurized hydraulic oil from different directions and for generating a steering force to steer the wheels of the vehicle in a left or right direction depending on from which direction the pressurized oil is received;

hydraulic pump means for pressurizing hydraulic oil from an oil reserve and supplying the pressurized hydraulic oil to a feeding side hydraulic pipe arrangement;

directional control valve means connected to the feeding side hydraulic pipe arrangement and the booster means for controlling which direction the pressurized hydraulic oil flows to the booster, the directional control valve means having first and second reaction chambers connected by a passage;

an oil pressure setting valve positioned in the feeding side hydraulic pipe arrangement between the hydraulic pump means and the directional control valve means;

pressurized oil injection valve means for injecting a pulse of pressurized hydraulic oil from the feeding side hydraulic pipe arrangement at an upstream side of the oil pressure setting valve to one of the first and second reaction chambers depending on the direction of a steering motion, the pulse of pressurized hydraulic oil being injected during an initial steering into a turn and an initial steering out of a turn; and reaction regulating valve means for throttling in response to varying motor vehicle speeds, the reaction regulating valve means being positioned in the passage connecting the first and second reaction chambers of the directional control valve means.

* * * * *

UNITED STATES PATENT AND TRADEMARK OFFICE
CERTIFICATE OF CORRECTION

PATENT NO. : 5,291,962
DATED : March 8, 1994
INVENTOR(S) : Fujio Momiyama et al.

It is certified that error appears in the above-indentified patent and that said Letters Patent is hereby corrected as shown below:

Col. 1, line 37, "aer" should be --are--.

Col. 2, lines 26-27, delete "drivers can be compensated for by reducing the time constant in"; and line 29, after "of" insert --drivers can be compensated for by reducing the time constant in--.

Col. 9, line 1, "ration" should be --ratio--.

Signed and Sealed this

Twenty-seventh Day of September, 1994

Attest:

BRUCE LEHMAN

Attesting Officer     Commissioner of Patents and Trademarks